May 29, 1928.
E. E. GREVE
1,671,579
TOOL JOINT
Filed Nov. 27, 1920
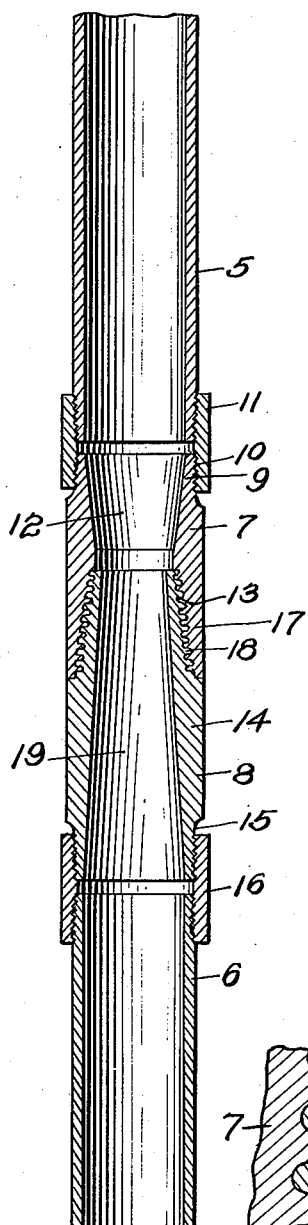
FIG.1.
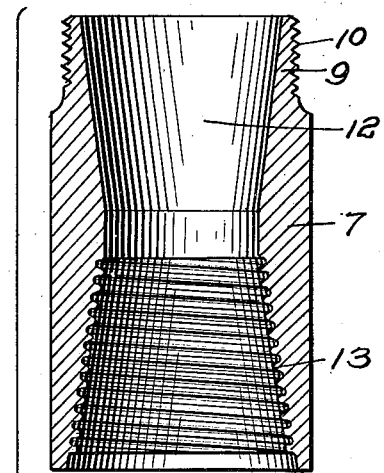
FIG.2.
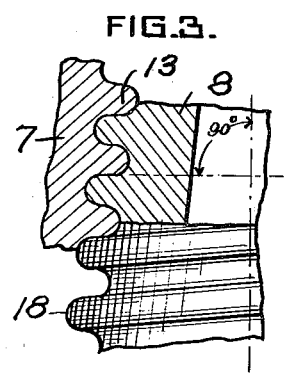
FIG.3.
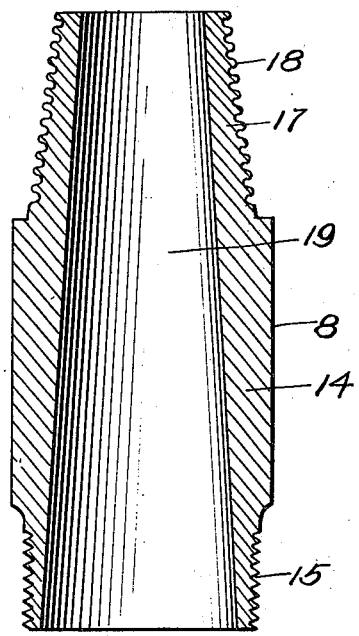
WITNESSES
INVENTOR
E. E. Greve Patented May 29, 1928.

1,671,579

UNITED STATES PATENT OFFICE.

EDGAR E. GREVE, OF BELLEVUE, PENNSYLVANIA.

TOOL JOINT.

Application filed November 27, 1920. Serial No. 426,760.

My invention relates to improvements in tool joints particularly adapted for use in connection with rotary drilling tools for earth boring, although it is, of course, applicable for other purposes.

In a rotary well drilling tool, the drill bit is carried at the end of a hollow shaft comprising sections of pipe jointed together. As the depth of the bore increases, new sections of pipe are inserted. In order to change the bit after it has become worn, or to withdraw the bit for any purpose, it is necessary to elevate the entire string of pipe, necessitating that the sections be disconnected at certain joints and stood in a vertical position in the derrick.

Inasmuch as the pipe sections are disconnected at these joints very frequently, the regular pipe thread that has ordinarily been used becomes damaged. For this reason, tool joints have been devised for connecting the pipe at these points, but they are not meeting with entire satisfaction, in that the threads are not so designed that when they are hardened, the edges will not chip or break. Furthermore, such joints have been so designed that they come into contact with the sides of the bore, and therefore have to be hardened on the exterior in order to avoid the abrasive action which would soon wear the joints if they were not hardened. Such hardening of the outside of the joint is undesirable for the reason that it cannot be gripped with a pipe tong for connecting and disjointing the pipe sections.

It is an object of the present invention to provide a tool joint in which the threads are so designed as to have no edges or corners, which, when hardened, will be liable to chip or crack.

A further object is to provide a joint which is so constructed that there will be considerable clearance between it and the sides of the bore, and hence need not be hardened.

These and other objects and advantages are obtained from my invention, which is illustrated in the accompanying drawings.

In the drawings,

Fig. 1 is a vertical section showing my invention connecting two sections of pipe;

Fig. 2 is a similar section on a larger scale of the two members forming the joint, showing them disconnected from each other; and Fig. 3 is an enlarged view showing in section and elevation the shape of the threads which I employ for connecting the two sections.

Referring to the drawings, 5 is an upper pipe section, 6 is a lower pipe section, 7 is known as the "box end" of the tool joint, and 8 is known as the "pin end" of the tool joint.

The box-end member 7 of the tool joint is cylindrical in shape and of a diameter which is larger than the diameter of the pipe, but in practice is less than the diameter of the bore. The upper end 9 thereof is reduced to a diameter corresponding with that of the pipe 5, and is threaded at 10. Connecting the pipe section 5 to the joint member 7 is a sleeve or coupling 11, said coupling being adapted to be threaded onto the pipe section and onto the threads 10 of the reduced end 9 of the box-end member. The coupling 11 has a diameter greater than the diameter of the box-end member 7, and it is hardened to prevent wear by contact with the walls of the bore.

In the upper end of the box-end member 7 is a tapered passage 12. The interior of the lower end of the box-end member is threaded, as indicated at 13, and this threaded interior is also preferably tapered so that the lower end thereof is widest. By forming the passages tapering, as shown, I do away with all shoulders or other projections liable to impede the free passage of fluid.

The body 14 of the pin-end member 8 is also cylindrical in shape and its diameter is the same as that of the box-end member 7. The lower end 15 thereof is reduced and threaded the same as the end 9 of the box-end member. A coupling 16, corresponding in all respects to coupling 11, serves to connect the lower pipe section 6 with the joint member 8. The upper end 17 of the pin-end member is threaded at 18 to cooperate with the interior threads 13 of the box-end member of the joint, and has a taper corresponding thereto. A passage 19 tapered in a direction opposite to passage 12 extends through member 8.

The shape of the threads 13 and 18 is shown on a large scale in Fig. 3. They are of the well known acme type, employed on cylindrical surfaces, which are perpendicular to the longitudinal axis of the threaded member, but the tops or crests of the threads, instead of being squared as heretofore, are rounded, as are also the bottoms of the grooves between the threads. The threads are hardened, as by any well known method of heat treatment. The shape thereof eliminates all sharp edges and corners which would be liable to chip or break, as is the case with the usual threads when they have been hardened.

In use, the pin-end member 8 of the joint is secured to the top of the lower pipe section 6 by the hardened coupling 16. The box-end member 7 is secured to the upper pipe section 5 by the hardened coupling 11. Because the connection between the pipes and the joint members is a relatively permanent one, and need not be disconnected every time the string of pipe is elevated, there is no objection to hardening the outsides of the sleeves 11 and 16 to prevent the wearing thereof by contact with the sides of the bore. After the joint members 7 and 8 have been connected to their respective pipe sections 5 and 6, the threaded portion 18 on one end of member 8 is screwed into the threaded opening 13 on the adjacent end of member 7.

When the pipe is elevated, the sections can be separated at these joints, and the threads will not readily become injured. The tapered passageways 12 and 19 avoid shoulders on the interior of the joint which would check or retard the flow of water therethrough. By reason of the cooperating joint members 7 and 8 having a diameter less than that of the bore and of the sleeves 11 and 16, it is unnecessary that they should be hardened, and therefore they may be readily gripped by pipe tongs.

What I claim is:

1. In combination with two sections of pipe, a hollow joint for detachably connecting them, said joint comprising two cylindrical members having cooperating threaded surfaces on their adjacent ends, and having their other ends threaded on the exterior thereof, and interiorly threaded hardened couplings connecting the pipe sections to the threaded exterior ends of the joint members, said coupling being of greater diameter than the diameter of the pipes or the cylindrical members, whereby the cylindrical members are protected from wearing.

2. In combination with two sections of pipe of a drill shaft, of a hollow joint therefor comprising two cylindrical joint members having cooperative threaded surfaces on their adjacent ends and having their other ends of a diameter to correspond to the diameter of the pipe, which ends are threaded on the exterior thereof, and interiorly threaded couplings connecting the pipe sections with the threaded exterior ends of said joint members, said couplings having a diameter greater than the diameter of said joint members, and being case-hardened, whereby they protect the joint members from wear, said joint members having untreated exterior surfaces whereby a wrench may readily cooperate therewith.

3. The combination with two pipe sections, of a hollow joint for detachably connecting the pipe sections including two members having cooperating hardened threaded portions on their adjacent ends, and having their other ends threaded, unhardened tong engaging surfaces on said members disposed between the said threaded portions, and hardened couplings connecting the pipe sections to the joint, said couplings being of greater diameter than the pipe sections and the joint members for protecting the said unhardened surfaces.

In testimony whereof I affix my signature.

EDGAR E. GREVE.